K. KOIKE & G. L. GRANT.
DISPLAY APPARATUS.
APPLICATION FILED MAY 31, 1912.
1,085,441.
Patented Jan. 27, 1914.
3 SHEETS—SHEET 1.
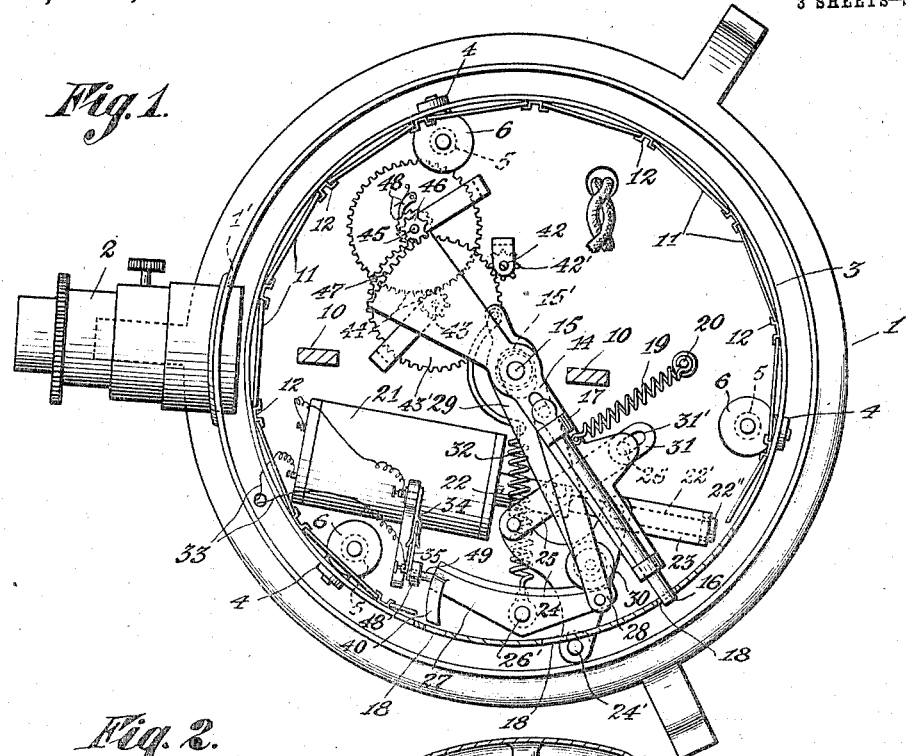

K. KOIKE & G. L. GRANT.
DISPLAY APPARATUS.
APPLICATION FILED MAY 31, 1912.
1,085,441.
Patented Jan. 27, 1914.
3 SHEETS—SHEET 2.
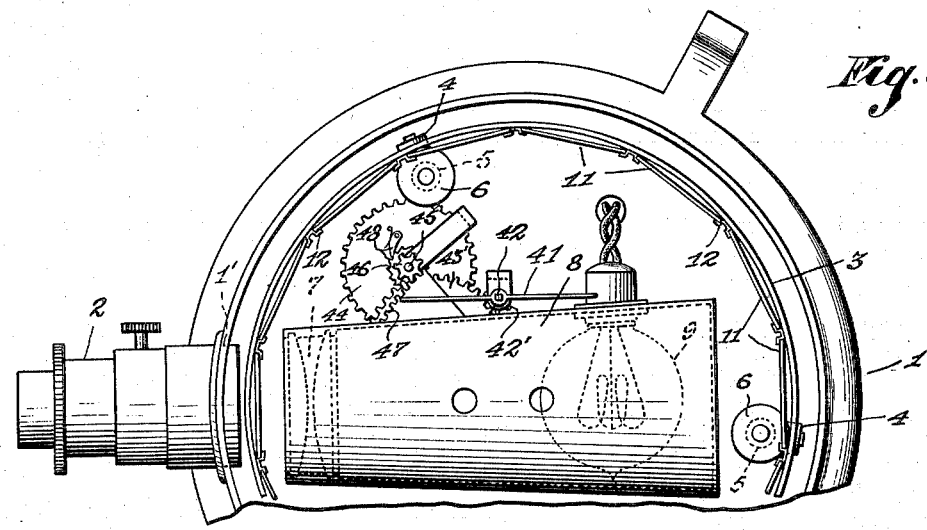
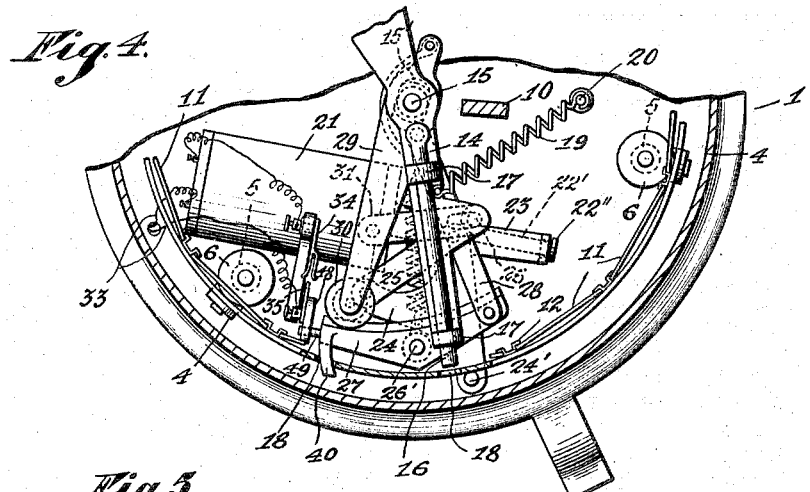
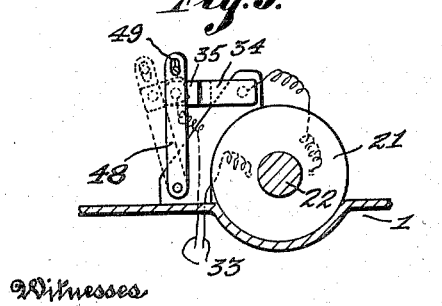
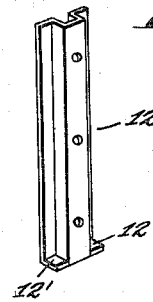
Inventors
Kihei Koike.
George L. Grant.

K. KOIKE & G. L. GRANT.
DISPLAY APPARATUS.
APPLICATION FILED MAY 31, 1912.

1,085,441.

Patented Jan. 27, 1914.
3 SHEETS—SHEET 3.

UNITED STATES PATENT OFFICE.

KIHEI KOIKE AND GEORGE L. GRANT, OF SEATTLE, WASHINGTON, ASSIGNORS TO KANICHI TAKAHASHY, OF SEATTLE, WASHINGTON.

DISPLAY APPARATUS.

1,085,441.

Specification of Letters Patent. Patented Jan. 27, 1914.

Application filed May 31, 1912. Serial No. 700,867.

*To all whom it may concern:*

Be it known that we, KIHEI KOIKE and GEORGE L. GRANT, subject of the Emperor of Japan and citizen of the United States, respectively, residing at Seattle, in the county of King and State of Washington, have invented certain new and useful Improvements in Display Apparatus, of which the following is a specification.

Our invention has for one of its objects to provide novel mechanism for advancing slides or other means containing display matter to and from a displaying position, and further, to generally simplify and improve display apparatus of this character.

Other objects will be set forth as our description progresses and those features of construction, arrangements and combinations of parts on which we desire protection succinctly defined in our annexed claims.

Figure 7:
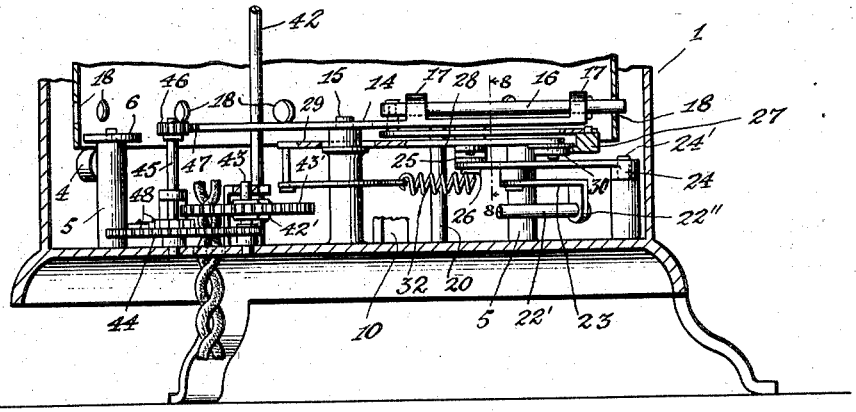
Figure 8:
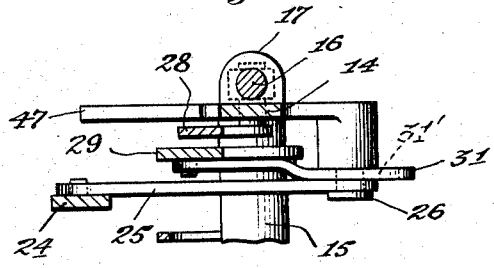

Referring to the accompanying drawings wherein we have shown our invention combined with suitable projection mechanism for projecting matter for display on a screen or other suitable surface: Figure 1 is a plan of the device with the cover of the casing, and the lamp chamber removed. Fig. 2 is a vertical section thereof with a portion of the chamber for the illuminating means broken away. Fig. 3 is a fragmentary plan of the device with the cover of the casing removed. Fig. 4 is a fragmentary sectional plan illustrating the driver advanced. Fig. 5 is a detail illustrating more particularly the switch mechanism. Fig. 6 is a detail perspective of one of the slide holders. Fig. 7 is a vertical cross section through the lower portion of the casing, and Fig. 8 is a fragmentary section taken through the driver on line 8—8 of Fig. 7.

Referring to the drawings by numerals of reference, 1 indicates a casing provided with a removable top wall or cover 13 and having its side wall formed with an opening 1' over which a projector 2, of any suitable or well known type, is secured.

Reference numeral 3 indicates a slide carrier, the same being rotatably mounted on rollers 4, journaled on stands 5, fixed to the bottom wall of casing 1.

Reference numeral 6 indicates guide rollers journaled on the upper end portions of stands 5 and engaging the inner face of carrier 3 to prevent lateral displacement of the latter.

Within carrier 3 and in line with projector 2, a condenser 7 is provided, this being mounted in the forward end portion of a chamber 8 provided with illuminating means, as for example, an electric lamp 9. Chamber 8 is supported on standards 10 of casing 1.

Carrier 3, which is cylindrical in form is provided in its wall with openings over which suitable slides 11, bearing the matter for display, are arranged, the said slides being mounted in holders 12. These holders which are secured, as by rivets, to carrier 3 intermediate the openings thereof are in the form of guides having their opposite side portions bent to angular formation to engage adjacent slides 11 and having at their lower portions, inturned lugs 12', as more clearly shown in Fig. 6. By the construction just described, holders of extremely simple construction are provided, and these, as will be observed, permit of the slides 11 being readily inserted or removed through their upper portions.

For operating carrier 3 intermittently to position the slides 11 successively in front of condenser 7, we provide mechanism now to be described.

Reference numeral 14 indicates a driver, journaled on a stub shaft 15, and 16 indicates an engaging member for alternately connecting and releasing carrier 3 with respect to said driver, the said engaging member 16 being guided in lugs 17 of driver 14 for movement lengthwise thereof, whereby when projected, its outer end portion can engage in suitable apertures, as 18, of the carrier.

Reference numeral 19 indicates a spring connected to driver 14 and to a fixed lug, as 20, of casing 1, for retracting said driver.

For operating driver 14 in its advance or active movement, we provide a solenoid 21, the core 22 of which is provided with an insulated stem extension 22' whose outer end portion is provided with a shoulder 22'' against which a link 23, apertured to freely receive stem 22', is yieldingly held by spring 19. Link 23 is pivoted to a Y-shaped lever 24, fulcrumed at 24' on casing 1 and having its other arm connected by a link 25 with a depending stud 26 of driver 14.

Reference numeral 27 indicates a setting device for engaging member 16, the same being horizontally disposed and fulcrumed, as at 26', substantially centrally of its length, and beneath or at the lower side of the path of driver 14. One end portion of setting device 27 is connected, as by a link 28, to the inner end portion of engaging member 16, by which construction adjustment of device 27 serves to project and retract the engaging member.

Reference numeral 29 indicates an actuator for setting device 27, the same comprising an arm having slotted engagement, as at 15', with stub shaft 15, whereby it is free for a limited travel in the direction of its length. The outer end portion of actuator 29 is provided with a bearing member or roller 30 adapted for travel on the inner face of device 27.

Reference numeral 31 indicates a link connection between actuator 29 and driver 14, the same having slotted engagement, as at 31', with stud 26 to permit of the inward and outward adjustments of actuator 29, as will be readily understood.

A spring 32, connected to fulcrum 26' and to the inner end portion of actuator 29, tends to yieldingly press the latter outwardly.

Reference numeral 33 indicates circuit wires, connected with a suitable source of electrical energy, not shown, for supplying current to solenoid 21. In one of these wires 33, we provide a switch comprising a contact 34, and an arm or knife 35, the latter of which is carried by a pivotal support 48, connected by pin 49 with setting device 27.

In the operation of the mechanism thus far described and with the parts in the position shown in Fig. 1, solenoid 21 is energized, and through the inward movement of its core 22, driver 14 will be swung forwardly through the connecting means comprising link 23, lever 24 and link 25. This movement of driver 14 effects, through link 31, a simultaneous advance movement of actuator 29, and as the latter passes over or beyond fulcrum 26' it will swing setting device 27 to substantially the position shown in Fig. 4 thereby opening switch parts 34, 35 and retracting engaging member 16. Spring 19 now returns driver 14 to its former or normal position, during which movement engaging member 16 is projected and yieldingly held in engagement with carrier 3 through spring 32 until the succeeding aperture 18 is encountered.

To insure of the proper setting of the slides 11 with respect to projector 2 and condenser 7, a locking device 40 is provided, this conveniently consisting of an outwardly projecting lug on the forward end portion of setting device 27 and adapted to be moved into and out of openings 18.

Reference numeral 41 indicates a governor for retarding return movement of driver 14, the same conveniently comprising a plurality of pliable wings which can be bent to obtain a greater or less resistance by the air to their travel. Governor 41 is mounted on a vertical shaft 42 provided with a pinion 42' in mesh with a gear 43' of an intermediate shaft 43, which latter is driven by suitable speed increasing gearing 44 from a shaft 45 which latter is provided with a pinion 46 meshing with a segmental rack 47, constituting a fixed extension of driver 14. One of the gears 44 is loosely mounted on shaft 45 and connected therewith through a pawl and ratchet connection 48 through the medium of which shaft 45 communicates movement to gearing 44 only during the backward or return movement of driver 14.

Having thus described our invention what we claim as new, and desire to secure by Letters Patent of the United States of America, is:—

1. In display apparatus, a slide carrier supported for movement, a driver supported for movement, a relatively movable engaging member on said driver, means for alternately projecting and retracting said engaging member to thereby connect and release said carrier, means for operating said driver in relatively opposite directions, and a governor for retarding said driver during movement in one direction.

2. In display apparatus, a slide carrier supported for movement, a driver for said carrier supported for movement, means for operating said driver, a relatively movable engaging member on said driver for connecting the latter to said carrier, means pivotally supported on a relatively fixed part for alternately projecting and retracting said engaging member to thereby connect and release said carrier, and means for swinging said second means to project and retract said engaging member.

3. In display apparatus, a slide carrier supported for movement, a driver supported for movement, means for operating said driver, a relatively movable engaging member on said driver, means for alternately projecting and retracting said engaging member to thereby connect and release said carrier said second means being pivotally supported on a relatively fixed part, and means for swinging said second means by and during movement of said driver to operate said engaging member.

4. In display apparatus, a slide carrier supported for movement, a driver supported for movement, a relatively movable engaging member on said driver, means for operating said driver in relatively opposite directions, means for alternately projecting and retracting said engaging member to thereby connect and release said carrier comprising a member movably supported and pivotally connected with said engaging member, and means for operating said member by and during movement of said driver.

5. In display apparatus, a slide carrier supported for movement, a driver supported for movement, means for operating said driver, a relatively movable engaging member on said driver, an angularly movable member operatively connected to the engaging member for alternately projecting and retracting said engaging member to thereby connect and release said carrier, and means operable by said driver for adjusting said angularly movable member.

6. In a display apparatus, a slide carrier supported for movement, carrier engaging means supported for movement, a movably supported driver connected to the carrier engaging means for operating the latter, means for operating said driver in relative opposite directions, pivotally mounted means operatively connected to the carrier engaging means for projecting and retracting the latter to thereby connect and release the carrier, and means operatively engaging the pivotally mounted means for automatically adjusting the latter.

7. In display apparatus, a slide carrier supported for movement, a driver supported for movement, means for operating said driver in relatively opposite directions, a relatively movable engaging member on said driver, means pivotally supported on a relatively fixed part for projecting and retracting said member to thereby connect and release said carrier, and means for adjusting said last named means by and during movement of said driver.

8. In display apparatus, a slide carrier supported for movement, a driver supported for movement, means for operating said driver in relatively opposite directions, a relatively movable engaging member on said driver, means pivotally supported on a relatively fixed part for projecting and retracting said member to thereby connect and release said carrier, and means for adjusting said last named means during movement of said driver.

9. In display apparatus, a slide carrier supported for movement, a driver supported for movement, means for operating said driver in relatively opposite directions, an engaging member supported on said driver for relative movement to alternately connect and release said carrier, a swingingly supported member at one side of the path of said driver connected with said engaging member for advancing and retracting the latter, and means movable with said driver for swinging said swingingly supported member.

10. In display apparatus, a slide carrier supported for movement, a driver supported for movement, means for operating said driver in relatively opposite directions, an engaging member supported on said driver for relative movement to alternately connect and release said carrier, a swingingly supported member at one side of the path of said driver connected with said engaging member for advancing and retracting the latter, means for swinging said member normally yieldingly pressed against the same for sliding thereon, and means for advancing and retracting said last named means by and during movement of said driver.

11. In display apparatus, a slide carrier supported for movement, a driver supported for movement, means for operating said driver in relatively opposite directions, an engaging member supported on said driver for relative movement to alternately connect and release said carrier, a swingingly supported member at one side of the path of said driver connected with said engaging member for advancing and retracting the latter, means for swinging said member normally yieldingly pressed against the same for sliding thereon, means connecting the last named means to the driver for relative movement, the latter being adapted to move the former through said connecting means.

12. In display apparatus, a slide carrier supported for movement, a driver supported for movement, means for operating said driver in relatively opposite directions, an engaging member movably supported on said driver for relative projection and retraction to alternately connect and release said carrier, a track member pivotally supported at the side of the path of said driver, an operative connection between said track member and said engaging member, whereby the latter will be alternately projected and retracted by swinging of the former, and means connected with said driver for movement thereby yieldingly held in engagement with said track member, for the purpose specified.

13. In display apparatus, a slide carrier supported for movement, a driver supported for movement, means for alternately connecting and releasing said carrier with respect to said driver supported on the latter for independent movement, electro-magnetic means for operating said driver, means for operating said first named means including a movably supported member arranged at the side of the path of said driver, and means operated by movement of said member of said last named means for deënergizing said electro-magnetic means.

14. In display apparatus, a slide carrier supported for movement, a driver supported for movement, an engaging member movably supported on said driver to alternately connect and release said carrier, electro-magnetic means for operating said driver, means movably supported on a relatively fixed part for operating said engaging member by and during movement of said driver, and means operated by movement of said last named means for deënergizing said electro-magnetic means.

15. In display apparatus, a slide carrier supported for movement, a driver supported for movement, means for operating said driver, a relatively movable engaging member on said driver, a movable member to alternately connect and release said carrier, means for adjusting said last named member by and during movement of said driver to relatively reversely inclined portions, and means for locking said carrier connected with said angularly movable member for operation thereby.

16. In display apparatus, a slide carrier supported for movement, a driver supported for movement, means for operating said driver, a relatively movable engaging member on said driver, a swingingly supported member for operating said engaging member to alternately connect and release said carrier, means for adjusting said last named member connected with said driver for movement thereby lengthwise of said member, means yieldingly pressing said last named means against said last named member, and a locking means for said carrier connected with said last named member for operation thereby.

17. In display apparatus, a rotatably supported slide carrier, a driver for intermittently rotating said carrier, means for operating said driver in relatively opposite directions, means on said driver for alternately connecting and releasing said carrier with respect thereto, and a rotary governor for retarding movement of said driver having a releasable driving connection with the latter, whereby it is operated during movement thereof in but one direction.

18. In display apparatus, a rotatably supported slide carrier, an oscillatory driver for intermittently rotating said carrier, means for oscillating said driver, slide carrier engaging means supported on said driver for relative movement, means for operating said slide carrier engaging means by and during movement of said driver to alternately connect and release said carrier, and a rotary governor having blades for retarding movement of said driver in one direction, said governor being operatively connected to the driver.

19. In display apparatus, a rotatably supported slide carrier, an oscillatory driver for intermittently rotating said carrier, means for oscillating said driver, slide carrier engaging means supported on said driver for relative movement, means for operating said slide carrier engaging means by and during movement of said driver to alternately connect and release said carrier, a rotary governor, means for driving said governor from said driver including a releasable driving connection operable to connect said governor with said driver during movement of the latter in but one direction.

20. In display apparatus, a rotatably supported slide carrier, an oscillatory driver for intermittently rotating said carrier, means for oscillating said driver, slide carrier engaging means supported on said driver for relative movement, means for operating said slide carrier engaging means by and during movement of said driver to alternately connect and release said carrier, a governor, a shaft carrying said governor, a rack on said driver, drive gearing for communicating motion of said driver to said shaft including a pinion in mesh with said rack and a loose gear on said shaft, and a pawl and ratchet connection between said gear and said shaft.

In testimony whereof we affix our signatures in presence of two witnesses.

KIHEI KOIKE.
GEORGE L. GRANT.

Witnesses:
MONCRIEFFE CAMERON,
EPHRAIM DAVID MILLS.